(12) United States Patent
Hirai et al.

(10) Patent No.: US 12,358,661 B2
(45) Date of Patent: Jul. 15, 2025

(54) TAKEOFF AND LANDING PAD APPARATUS

(71) Applicant: MITSUBISHI HEAVY INDUSTRIES, LTD., Tokyo (JP)

(72) Inventors: Makoto Hirai, Tokyo (JP); Ichiro Oba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/788,155

(22) Filed: Jul. 30, 2024

(65) Prior Publication Data

US 2025/0074633 A1    Mar. 6, 2025

(30) Foreign Application Priority Data

Sep. 6, 2023    (JP) .................................. 2023-144158

(51) Int. Cl.
*B64U 70/90*    (2023.01)
*B64F 1/24*    (2006.01)

(52) U.S. Cl.
CPC ................ *B64U 70/90* (2023.01); *B64F 1/24* (2013.01)

(58) Field of Classification Search
CPC .......... B64F 1/007; B64F 1/0297; B64F 1/22; B64F 1/24; B64U 70/90; B64U 70/92; B64U 70/93; B64U 70/95; B64U 70/97; B64U 70/99; E01F 3/00
USPC ....................... 244/110 E, 114 R, 116, 116 R
See application file for complete search history.

(56) References Cited

U.S. PATENT DOCUMENTS

| | | | | |
|---|---|---|---|---|
| 4,834,321 | A * | 5/1989 | Granger | B64F 1/125 410/12 |
| 9,387,928 | B1 * | 7/2016 | Gentry | B64U 50/39 |
| 9,527,605 | B1 * | 12/2016 | Gentry | G05D 1/0094 |
| 9,630,713 | B1 * | 4/2017 | Von Novak, III | B64U 20/70 |
| 10,850,866 | B2 * | 12/2020 | Fisher | B64C 29/02 |
| 12,163,297 | B1 * | 12/2024 | Airoldi | E01F 3/00 |
| 2016/0280359 | A1 * | 9/2016 | Semke | B64U 60/60 |
| 2018/0327091 | A1 * | 11/2018 | Burks | B64U 50/13 |
| 2019/0100331 | A1 * | 4/2019 | Wright | B64U 10/25 |
| 2021/0122495 | A1 * | 4/2021 | Rezvani | B64F 1/007 |
| 2024/0101276 | A1 * | 3/2024 | Aharoni | B64F 1/32 |
| 2024/0239533 | A1 * | 7/2024 | Li | B64U 70/99 |
| 2024/0278946 | A1 * | 8/2024 | Roberts | B64U 10/16 |
| 2024/0286770 | A1 * | 8/2024 | Guwaifli | B64U 30/299 |

FOREIGN PATENT DOCUMENTS

| | | |
|---|---|---|
| JP | 2021-032017 A | 3/2021 |
| JP | 2021-046111 A | 3/2021 |
| JP | 2022-082189 A | 6/2022 |

* cited by examiner

*Primary Examiner* — Joshua E Rodden
(74) *Attorney, Agent, or Firm* — HAUPTMAN HAM, LLP

(57) ABSTRACT

A takeoff and landing pad apparatus for an unmanned aerial vehicle includes: a pad including a takeoff and landing surface; a mooring mechanism configured to moor the unmanned aerial vehicle on the pad; a drive source configured to rotate the pad together with the mooring mechanism; and a controller configured to control operation with the mooring mechanism and the drive source. The controller drives, based on information about a wind direction to be acquired, the drive source to rotate such that a nose of the unmanned aerial vehicle on the takeoff and landing surface faces the wind direction.

5 Claims, 5 Drawing Sheets

TAKEOFF AND LANDING PAD APPARATUS

CROSS-REFERENCE TO RELATED APPLICATIONS

This application claims the benefit of priority to Japanese Patent Application Number 2023-144158 filed on Sep. 6, 2023. The entire contents of the above-identified application are hereby incorporated by reference.

TECHNICAL FIELD

The disclosure relates to a pad suitable for an unmanned aerial vehicle (UAV) to take off and land.

RELATED ART

It is known that a UAV is caused to take off from a pad and land on the pad. Note that although an unmanned aerial vehicle called a drone is also known, in the disclosure, the term "drone" is treated as synonymous with "UAV". Also, "pad" is treated as synonymous with "port".

JP 2021-32017 A discloses a port that can reduce the influence of crosswind at the time of takeoff and landing of a drone and improve landing accuracy and safety at the time of takeoff and landing. A drone port disclosed in JP 2021-32017 A includes a protective wall that surrounds an outer periphery of a takeoff and landing surface, and a turbulence reduction device that is provided at an upper end of the protective wall and reduces turbulence generated by crosswind. The protective wall includes a strength wall located on the outside and a soft wall located on the inside. The drone port further includes a downwash exhaust port that allows downwash by the drone to flow outward from below the protective wall downward or diagonally downward.

SUMMARY

According to the port disclosed in JP 2021-32017 A, it is possible to reduce the influence of crosswind at the time of takeoff and landing of the drone, and to suppress or reduce the generation of turbulence, enabling stable attitude control.

However, the port disclosed in JP 2021-32017 A is based on the premise that the port includes the protective wall having a considerable height, and it cannot be denied that, for example, a rotary blade of the drone may come into contact with the protective wall. In fact, in JP 2021-32017 A, the inner side of the protective wall is the soft wall in order to prevent damage due to a collision of the rotary blade against the protective wall.

In view of the above, an object of the disclosure is to provide a pad that enables stable takeoff by reducing the influence of wind particularly at the time of takeoff.

A takeoff and landing pad apparatus for an unmanned aerial vehicle according to the disclosure includes: a pad including a takeoff and landing surface; a mooring mechanism configured to moor the unmanned aerial vehicle on the pad; a drive source configured to rotate the pad together with the mooring mechanism; and a controller configured to control operation with the mooring mechanism and the drive source.

The controller of the disclosure drives the drive source to rotate such that the nose of the unmanned aerial vehicle on the takeoff and landing surface faces the wind direction based on information about a wind direction to be acquired.

The disclosure drives, based on information about the wind direction to be acquired, the drive source to rotate such that the nose of the unmanned aerial vehicle on the takeoff and landing surface faces the wind direction, that is, the nose faces upwind. If the nose faces the wind direction, stable takeoff can be performed.

BRIEF DESCRIPTION OF DRAWINGS

The disclosure will be described with reference to the accompanying drawings, wherein like numbers reference like elements.

DESCRIPTION OF EMBODIMENTS

Figure 1:
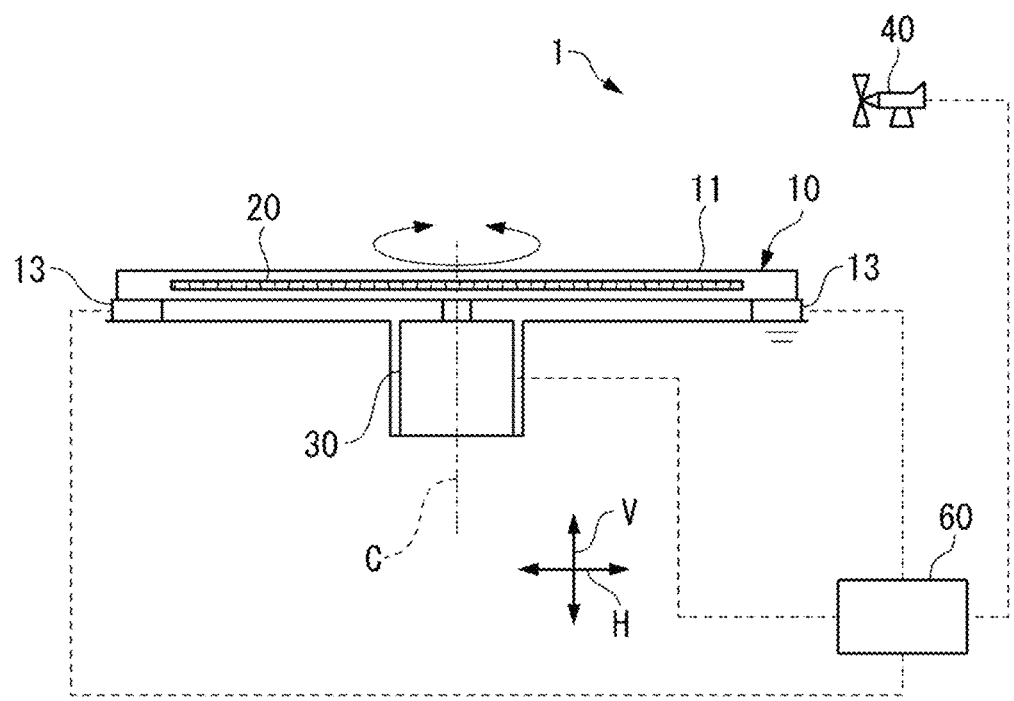
FIG. 1 is a side view (upper view) and a plan view (lower view) illustrating a schematic configuration of a takeoff and landing pad apparatus according to a first embodiment.
Figure 1:
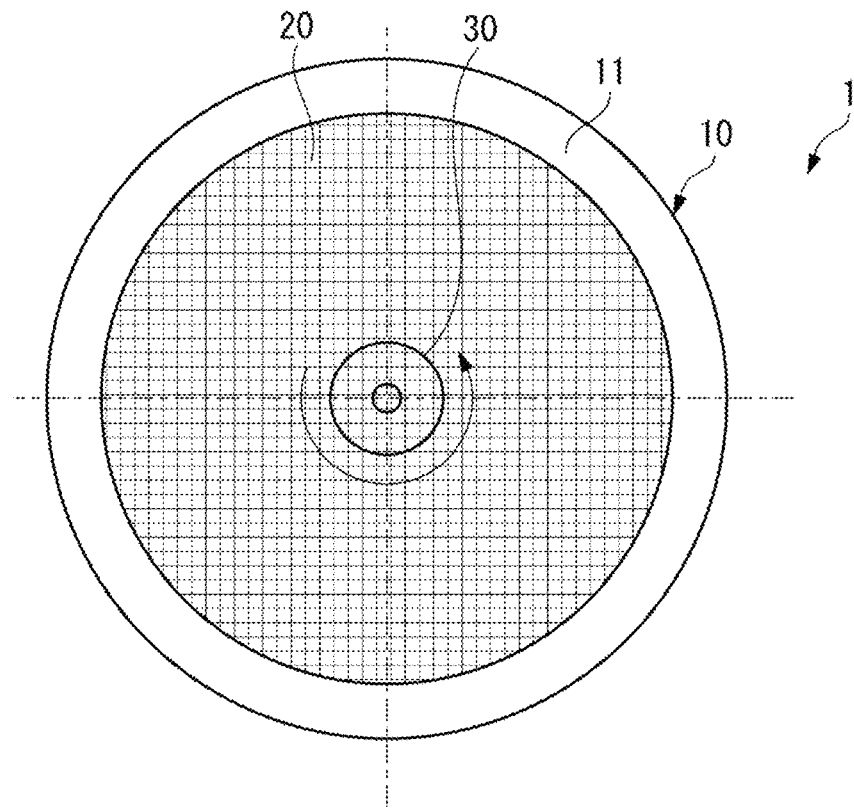

Embodiments of a takeoff and landing pad apparatus will be described below with reference to the accompanying drawings.

First Embodiment

A takeoff and landing pad apparatus 1 rotates a pad 10 on which a drone 100 (FIG. 3) is placed such that a nose 101 of the drone 100 faces upwind in accordance with a direction of surrounding wind. That is, the takeoff and landing pad apparatus 1 can enable stable takeoff by creating a situation in which the wind blows from the front when the drone 100 takes off.

Overall Configuration of Takeoff and Landing Pad Apparatus 1: See FIG. 1

The takeoff and landing pad apparatus 1 includes the pad 10 including a takeoff and landing surface 11, an electromagnet 20 as a mooring mechanism that moors the drone 100 on the pad 10, an electric motor 30 as a drive source that rotates the pad 10 together with the electromagnet 20, and a controller 60 that controls operation of the electromagnet 20 and the electric motor 30. The takeoff and landing pad apparatus 1 includes a wind vane anemometer 40 adjacent to the pad 10, and information about a wind direction (measured wind direction Df) and information about a wind speed (measured wind speed Sf) measured by the wind vane anemometer 40 are provided to the controller 60. The controller 60 controls the operation of the electric motor 30, the electromagnet 20, and the like based on the acquired wind direction information and wind speed information.

Pad 10: FIG. 1

The pad 10 has a disk-like shape, and the takeoff and landing surface 11 for the drone 100 is provided at a front surface of the pad 10. The drone 100 is placed on the takeoff and landing surface 11 before takeoff, and lands on the takeoff and landing surface 11 after finishing the flight. The pad 10 has a rotation axis C and is driven to rotate about the rotation axis C.

As long as the integrity of the pad 10 can be maintained with the drone 100 placed thereon, the material constituting the pad 10 is arbitrary. However, when the electromagnet 20 is used as the mooring mechanism, at least the side of the takeoff and landing surface 11 needs to be made of a material through which magnetic field lines generated by the electromagnet 20 can pass. A soft magnetic material is known as a material that prevents magnetic field lines from passing through. When the takeoff and landing surface 11 is made of a soft magnetic material, there is a possibility that the magnetic field lines generated from the electromagnet 20 cannot reach to a necessary portion.

The pad 10 having a disc-like shape is merely an example, and the pad 10 may have a polygonal shape such as a quadrangular shape or a pentagonal shape, or other shapes.

The pad 10 includes a load cell 13 as an instrument for measuring a thrust force of the drone 100. The load cell 13 measures a measured thrust force Nf, which is a load after a rotor 103 of the drone 100 moored on the pad 10 starts rotating, and transmits the measured thrust force Nf to the controller 60. The measured thrust force Nf is compared with a reference thrust force Nc held by the controller 60, and is used as a factor for determining whether to continue mooring or to unmoor the drone 100 by the electromagnet 20 as the mooring mechanism.

The measured thrust force Nf is based on the rotation of the rotor 103, the thrust force can be estimated based on the rotational speed of the rotor 103, and thus it is also possible to determine whether to continue mooring or release the mooring of the drone 100 by using the rotational speed (measured rotational speed) of the rotor 103 in substitution for the measured thrust force Nf. In this case, a comparison target is a reference rotational speed for the rotor 103. The means for acquiring a measured rotational speed of the rotor 103 is arbitrary. The rotational speed of the rotor 103 may be measured using a laser displacement meter, or a rotational speed of the rotor 103 included in vehicle information transmitted from the drone 100 to the controller 60 may be used. In the drone 100, when the electric motor rotates the rotor 103, the rotational speed of the rotor 103 can be regarded as being equivalent to the rotational speed of the electric motor, and thus the rotational speed of the electric motor can be used in substitution for the rotational speed of the rotor 103. The same holds true in the output of the electric motor.

Electromagnet 20: See FIG. 1

As an example, the electromagnet 20 is embedded inside the pad 10, and generates magnetic field lines by being supplied with electric power from a power supply (not illustrated) in accordance with an instruction from the controller 60. For example, the magnetic field lines act on, for example, a skid 105 made of a soft magnetic material of the drone 100 to attract the skid 105, whereby the drone 100 is moored on the pad 10 by the electromagnet 20. When the supply of the electric power is stopped in accordance with an instruction from the controller 60, the mooring of the drone 100 by the electromagnet 20 is released.

The electromagnet 20 is provided over a considerable range of the takeoff and landing surface 11. Thus, since the range covered by the magnetic field lines generated from the electromagnet 20 is wide, for example, even when the drone 100 is slightly displaced from the center of the takeoff and landing surface 11, the electromagnet 20 as the mooring mechanism can moor the drone 100. That is, the mooring mechanism using the electromagnet 20 can moor the drone 100 not only at a predetermined position, but also even when the drone 100 is displaced from a designated position.

The electromagnet 20 as the mooring mechanism can be caused to function not only when the drone 100 takes off but also when the drone 100 lands on the pad 10. That is, immediately after the drone 100 lands on the pad 10, the drone 100 can be moored by supplying electric power to the electromagnet 20 in accordance with an instruction from the controller 60. In this way, the drone 100 can stably land on the pad 10 without falling down due to disturbance such as surrounding wind.

Electric Motor 30: See FIG. 1

The electric motor 30 is rotated in accordance with an instruction from the controller 60 to rotate the pad 10. The electric motor 30 is rotated in accordance with an instruction of the controller 60 so as to cause the nose 101 of the drone 100 placed to face a detected wind direction.

The type of the electric motor 30 is not limited as long as the purpose thereof can be achieved. For example, a stepping motor whose rotation angle and rotational speed can be controlled by a pulse signal can be used. Since the stepping motor has a holding force even in a stop time during which no electric power is supplied, the pad 10 can be held at a position in a predetermined rotation direction without relying on a mechanical brake.

The drive source is not limited to an electric motor driven by electric power, but may be driven by other energy, such as a hydraulic motor driven by hydraulic oil supplied from a hydraulic pump, for example.

Wind Vane Anemometer 40: See FIG. 1

The wind vane anemometer 40 measures a wind direction and a wind speed around the takeoff and landing pad apparatus 1, and sends a measured wind direction Df and a measured wind speed Sf related to the measured wind direction and the measured wind speed to the controller 60.

The type of the wind vane anemometer 40 is not limited as long as the purpose thereof can achieved. Typically, a wind vane anemometer of a propeller type can be used. The wind vane anemometer 40 includes, for example, a wind direction transmitter of an optical encoder type using an airplane tail and a wind speed transmitter using the rotation of a propeller. Signals obtained by the wind direction transmitter and the wind speed transmitter are output by converting an instantaneous wind direction and an instantaneous wind speed into DC voltages (DCV). The controller 60 acquires the measured wind direction Df and the measured wind speed Sf converted into the DC voltages from the wind vane anemometer 40.

In the present embodiment, the takeoff and landing pad apparatus 1 includes the wind vane anemometer 40, but the wind vane anemometer 40 is not an essential component in the disclosure. That is, any means may be used as long as the measured wind direction Df and the measured wind speed Sf of the takeoff and landing pad apparatus 1 and the surroundings thereof can be obtained. Thus, the measured wind direction Df and the measured wind speed Sf can be acquired on a continuous manner from a provider of weather information or the like.

Controller 60: See FIG. 1

The controller 60 acquires the measured wind direction Df and the measured wind speed Sf from the wind vane anemometer 40, and acquires the measured thrust force Nf from the load cell 13. The controller 60 controls the rotation of the electric motor 30 based on the acquired measured wind direction Df and the acquired measured wind speed Sf to direct the nose 101 of the drone 100 upwind. In addition, the controller 60 compares the acquired measured thrust force Nf with the reference thrust force Nc to control whether the drone 100 needs to be moored by the electromagnet 20.

The drone 100 grasps its own vehicle information, and the controller 60 acquires this vehicle information. Examples of the vehicle information include rotational speed information (actual rotational speed) of the rotor 103 and orientation information of the drone 100. As an example, the orientation information includes information specifying the orientation of the nose 101 measured by a magnetic sensor included in the drone 100.

Information Managed by Controller 60: See FIG. 1

As a premise of the above control by the controller 60, information managed by the controller 60 will be collectively described.

Figure 2:
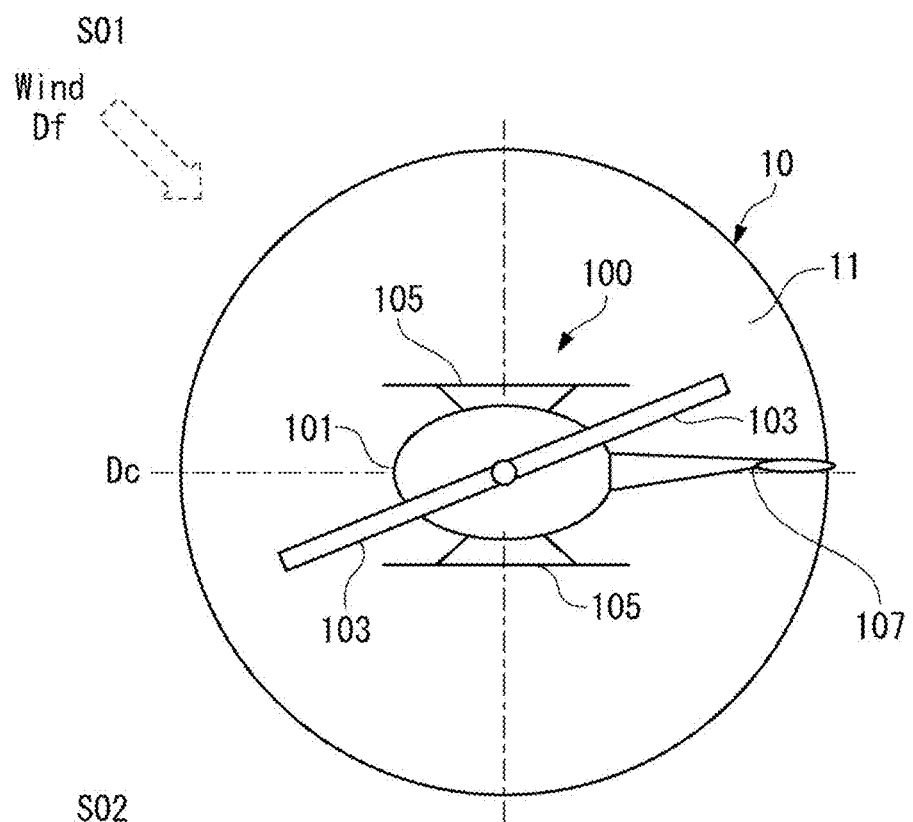
FIG. 2 is a diagram illustrating the operation of the takeoff and landing pad apparatus according to the first embodiment.
Figure 2:
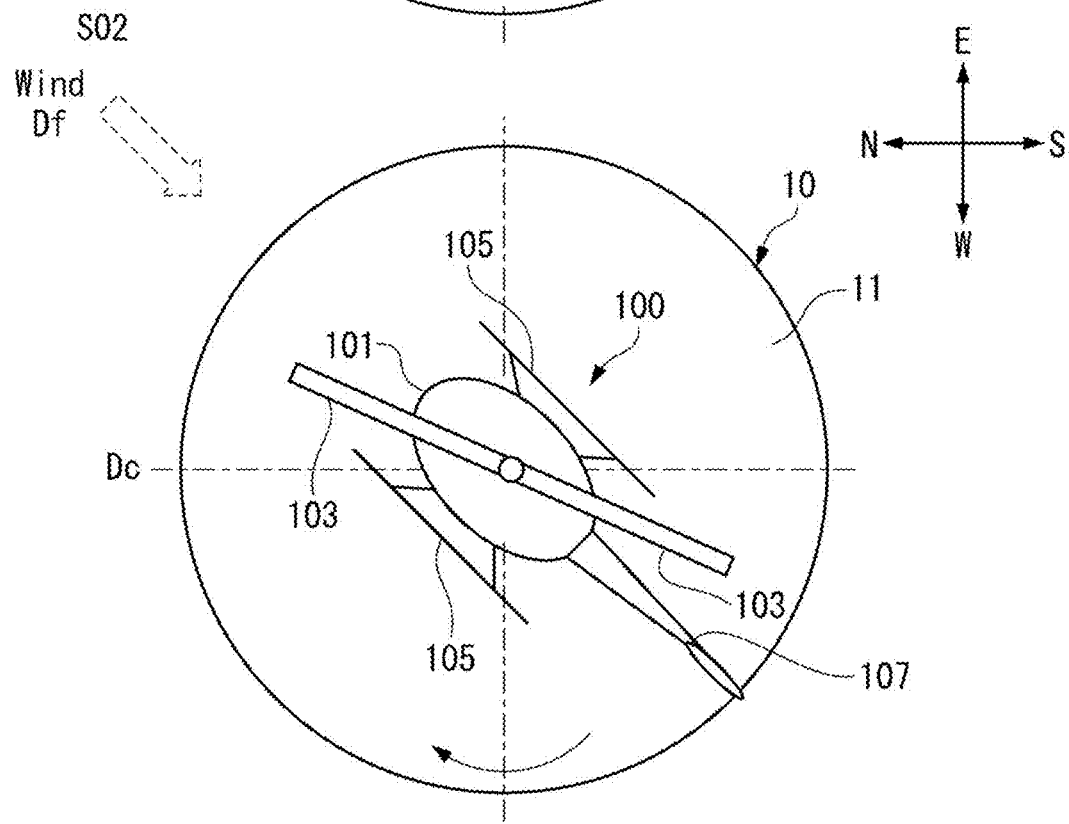

The drone 100 to be placed on the pad 10 is placed on the takeoff and landing surface 11 with the nose 101 facing a predetermined direction, for example, N (north, $\theta=0°$) out of four directions (S01 in FIG. 2). The controller 60 stores this reference direction Dc. The reference direction Dc is compared with the measured wind direction Df acquired from the wind vane anemometer 40. The orientation information of the drone 100 described above may be used as the reference direction Dc.

The controller 60 also stores a reference wind speed Sc. The reference wind speed Sc is compared with the measured wind speed Sf. In addition to the wind speed, a wind scale called a wind force is known. The wind force is represented by classifying wind speeds into 13 levels (Beaufort scale of wind force) of 0 to 12. Thus, in the disclosure, the wind force is still information about a wind speed.

Further, the controller 60 stores the reference thrust force Nc. The reference thrust force Nc is compared with the measured thrust force Nf acquired from the load cell 13. The rotational speed of the rotor 103 described above can be used in substitution for the thrust force.

The information managed by the controller 60 is listed below.

Information to be stored: Reference direction Dc (orientation of the drone 100), reference wind speed Sc, and reference thrust force Nc.

Information to be acquired: Measured wind direction Df, measured wind speed Sf, measured thrust force Nf (rotational speed of the rotor 103).

Figure 3:
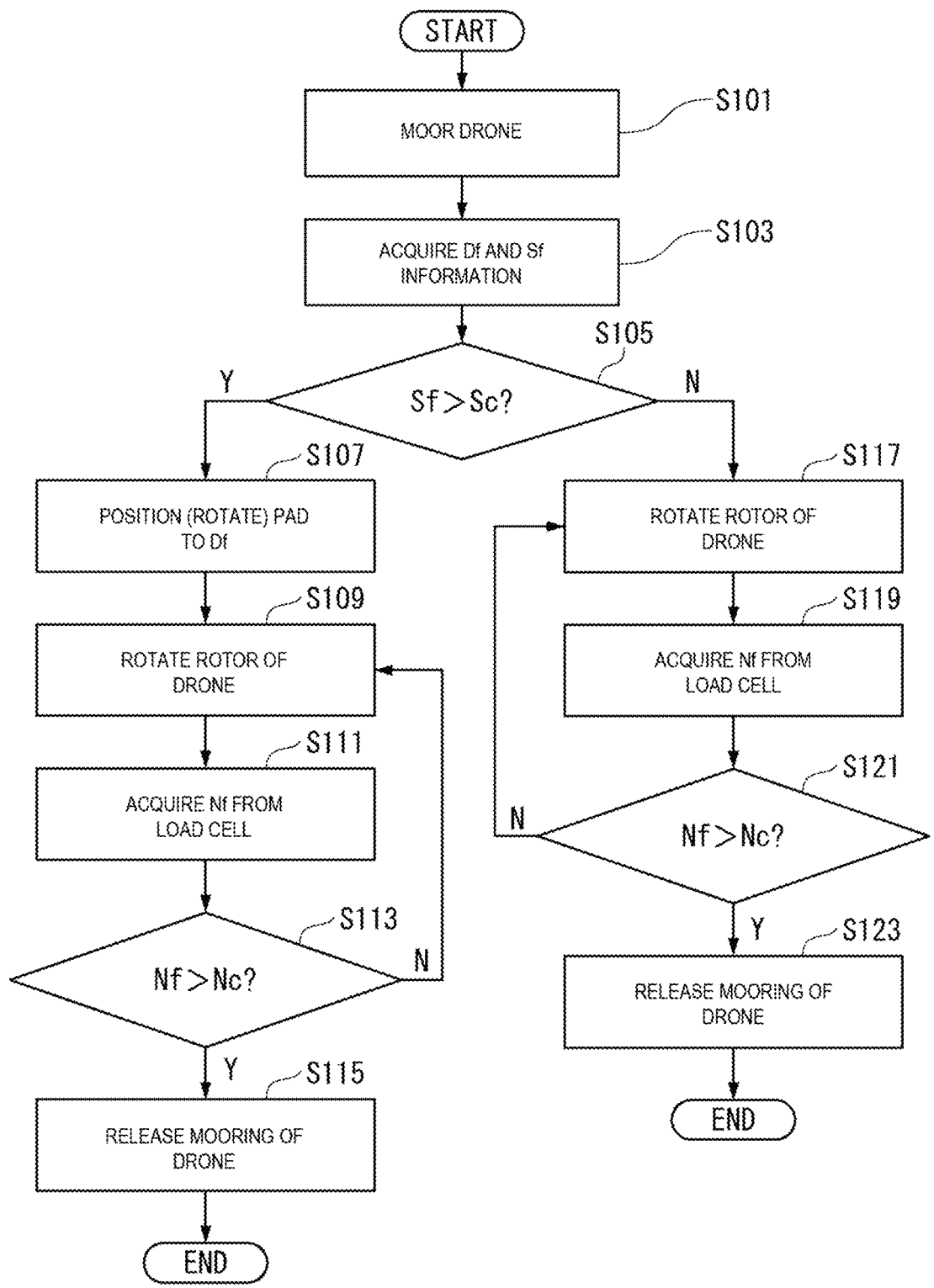
FIG. 3 is a flowchart illustrating a control procedure of the takeoff and landing pad apparatus according to the first embodiment.

Control Procedure of Takeoff and Landing Pad Apparatus 1: FIGS. 2 and 3

Next, a control procedure of the takeoff and landing pad apparatus 1 by the controller 60 will be described with reference to FIGS. 2 and 3.

As illustrated in S01 of FIG. 2, the drone 100 is parked with the nose 101 facing the reference direction Dc. In addition, electric power is supplied to the electromagnet 20 in accordance with an instruction from the controller 60, whereby the drone 100 is moored on the pad 10 (S101 in FIG. 3). At this time, it is assumed that the rotor 103 of the drone 100 is stopped.

The controller 60 acquires the measured wind direction Df and the measured wind speed Sf from the wind vane anemometer 40 (S103 in FIG. 3). The controller 60 compares the acquired measured wind speed Sf with the reference wind speed Sc (S105). The reason for this comparison is as follows. That is, when the measured wind speed Sf is lower than the reference wind speed Sc, there is no problem if the drone 100 takes off while keeping the present attitude without directing the nose 101 of the drone 100 upwind. Thus, the subsequent control differs depending on the comparison result between the measured wind speed Sf and the reference wind speed Sc.

Case Where Nose 101 is Directed Upwind by Rotating Pad 10

When the measured wind speed Sf is higher than the reference wind speed Sc (S105: Y), the controller 60 drives the electric motor 30 such that the reference direction Dc at the pad 10 matches the measured wind direction Df. Here, as illustrated in FIG. 2, when the measured wind direction Df is northeast, the measured wind direction Df is 45°. Since the reference direction Dc is 0°, the controller 60 instructs the electric motor 30 to rotate the pad 10 clockwise by 45° in order to eliminate the difference between these directions (S107). Accordingly, the nose 101 of the drone 100 can be directed upwind (S02 in FIG. 2).

The controller 60 rotates the rotor 103 of the drone 100 after the electric motor 30 rotates the pad 10 by a predetermined angle, here, 45° (S109). At this time, the drone 100 is still moored on the pad 10 by the magnetic force of the electromagnet 20. Thus, the thrust force of the drone 100 associated with the rotation of the rotor 103 is applied to the pad 10.

The controller 60 acquires the measured thrust force Nf applied to the pad 10 (S111) and compares the measured thrust force Nf with the reference thrust force Nc stored in advance (S113).

When the measured thrust force Nf is larger than the reference thrust force Nc, the controller 60 determines that the thrust force necessary for stable flight has been generated in the drone 100 (S113: Y), issues an instruction to stop the supply of electric power to the electromagnet 20, and unmoors the drone 100 by the electromagnet 20 (S115). Then, the drone 100 starts flying. When the measured thrust force Nf is not larger than the reference thrust force Nc (S113: N, measured thrust force Nf≤ reference thrust force Nc), the controller 60 performs the comparison between the reference thrust force Nc and the measured thrust force Nf without releasing the mooring of drone 100 until the measured thrust force Nf becomes larger than the reference thrust force Nc.

Case Where Flight is Started With Pad 10 Left as it is

On the other hand, when the measured wind speed Sf is not higher than the reference wind speed Sc (S105: N, Sf≤Sc), the rotor 103 of the drone 100 is rotated without rotating the pad 10 (S117). At this time, the drone 100 is still moored on the pad 10 by the magnetic force of the electromagnet 20. Thus, the thrust force of the drone 100 associated with the rotation of the rotor 103 is applied to the pad 10.

The controller 60 acquires the measured thrust force Nf applied to the pad 10 (S119) and compares the measured thrust force Nf with the reference thrust force Nc stored in advance (S121).

When the measured thrust force Nf is larger than the reference thrust force Nc, the controller 60 determines that the thrust force necessary for stable flight has been generated in the drone 100 (S121: Y), issues an instruction to stop the supply of electric power to the electromagnet 20, and unmoors the drone 100 by the electromagnet 20 (S123). Then, the drone 100 starts flying. When the measured thrust force Nf is not larger than the reference thrust force Nc (S121: N, measured thrust force Nf≤reference thrust force Nc), the controller 60 performs the comparison between the reference thrust force Nc and the measured thrust force Nf without unmooring the drone 100 until the measured thrust force Nf becomes larger than the reference thrust force Nc.

Advantageous Effects of Takeoff and Landing Pad Apparatus 1

According to the takeoff and landing pad apparatus 1, the following effects are achieved.

According to the takeoff and landing pad apparatus 1, since the nose 101 can be directed upwind by rotating the pad 10, it is possible to contribute to stable takeoff of the drone 100. In particular, according to the takeoff and landing pad apparatus 1, since the pad 10 is rotated when the measured wind speed Sf is higher than the reference wind speed Sc, that is, the nose 101 needs to be directed upwind, it is possible to realize efficient takeoff of the drone 100.

According to the takeoff and landing pad apparatus 1, since the flight of the drone 100 is controlled based on the measured wind speed Sf and the measured wind direction Df detected by the wind vane anemometer 40 attached at the periphery of the takeoff and landing pad apparatus 1, the accuracy of the flight control is high.

According to the takeoff and landing pad apparatus 1, since the nose 101 of the drone 100 faces the predetermined reference direction Dc, a rotation angle by the electric motor 30 can be easily acquired by the comparison with the measured wind direction Df.

The takeoff and landing pad apparatus 1 unmoors the drone 100 by the electromagnet 20 based on the comparison between the measured thrust force Nf and the reference thrust force Nc acquired for the drone 100 before takeoff, allowing stable takeoff of the drone 100 to be ensured. Causing the electromagnet 20 as the mooring mechanism to function at the time of landing also allows stable landing of the drone 100 to be ensured.

According to the takeoff and landing pad apparatus 1, the drone 100 is moored by the magnetic field lines of the electromagnet 20. That is, the mooring by the electromagnet 20 is performed without contact with any part of the drone 100. Thus, according to the takeoff and landing pad apparatus 1, the mooring is started and released more quickly than when the mooring is mechanically performed. Further, according to the takeoff and landing pad apparatus 1, the drone 100 can be moored even when the parking position of the drone 100 is slightly displaced.

Modified Example of Control Procedure

A part of the control procedure described above can be changed as follows.

Although the rotor 103 of the drone 100 starts rotating after the comparison between the measured wind speed Sf and the reference wind speed Sc, in the disclosure, the rotor 103 can be rotated after the drone 100 is moored by the electromagnet 20.

Further, the pad 10 is rotated based on the comparison result between the measured wind speed Sf and the reference wind speed Sc. However, in the disclosure, it is permissible to rotate the pad 10 without comparing the measured wind speed Sf with the reference wind speed Sc.

Furthermore, although the example in which the nose 101 faces the predetermined reference direction Dc has been described, the disclosure can be implemented even when the direction of the nose 101 is not specified in advance. For example, the orientation information acquired from the drone 100 described above can be used. In addition, for example, by acquiring the reference direction Dc of the nose 101 parked on the takeoff and landing surface 11 by a detection sensor such as a camera, the pad 10 can be rotated such that the nose 101 faces upwind.

Positional Movement of Pad 10

The position of the pad 10 of the takeoff and landing pad apparatus 1 described above may be fixed at a specific location, or may be moved. For example, the takeoff and landing pad apparatus 1 can be moved to any location by mounting the pad 10, the electromagnet 20, the electric motor 30, the wind vane anemometer 40, and the controller 60, which are components of the takeoff and landing pad apparatus 1, on a mobile body such as a vehicle, an aircraft, or a ship. In this case, a transmitter using a satellite positioning system, for example, a global positioning system (GPS) is provided at the pad 10 or the mobile body. This GPS transmitter acquires position information by receiving and measuring electric waves of artificial satellites constituting the GPS system, and provides the position information to the drone 100. Accordingly, the drone 100 can recognize the current position of the pad 10 whose position has been changed after takeoff based on the acquired position information, so that the drone 100 can land.

Second Embodiment: See FIG. 4

Next, a takeoff and landing pad apparatus 2 according to a second embodiment will be described.

The takeoff and landing pad apparatus 2 includes a tilting mechanism 50 for the pad 10 in addition to the takeoff and landing pad apparatus 1. The tilting mechanism 50 tilts the pad 10 such that the nose 101 faces downward and a tail 107 faces upward in a state where the nose 101 faces upwind. Hereinafter, the takeoff and landing pad apparatus 2 will be described with a focus on differences from the takeoff and landing pad apparatus 1.

Tilting Mechanism 50: See FIG. 4

The tilting mechanism 50 includes a hydraulic cylinder 51, which is an example of a raising and lowering means, and a rotary table 55 on which the hydraulic cylinder 51 is mounted. A pair of load cells 13A and 13B are provided on the upper surface of the rotary table 55, and the hydraulic cylinder 51 is mounted on one load cell 13A. The rotary table 55 is rotatable by the electric motor 30.

One peripheral edge of the pad 10 is engaged with the load cell 13B, and the other peripheral edge is engaged with a piston rod 53 of the hydraulic cylinder 51. The pad 10 can be rotated in conjunction with the rotary table 55 rotated by the electric motor 30.

In the hydraulic cylinder 51, the piston rod 53 extends and contracts in accordance with an instruction from the controller 60. The electric motor 30 rotates in accordance with an instruction from the controller 60.

The hydraulic cylinder 51 is an example of a raising and lowering means. As a raising and lowering means, a linear motor may be used, or a combination of a rotary electric machine such as the electric motor 30 and a mechanism that converts the rotation of the rotary electric machine into a linear motion may be used.

In the takeoff and landing pad apparatus 2, as an example, the hydraulic cylinder 51 is provided on only one of the pair of load cells 13A and 13B. Thus, as illustrated in S11 of FIG. 4, the pad 10 is inclined such that the side of the load cell 13B is low and the side of the load cell 13A is high in an initial state. This state is called a standby state. However, in the present embodiment, the pad 10 may be in a standby state in which the pad 10 is parallel to a horizontal direction H. For example, the pad 10 can be brought into the standby state in which the pad 10 is parallel to the horizontal direction H by providing the hydraulic cylinder 51 on both of the pair of load cells 13A and 13B. Alternatively, the pad 10 can be brought into the standby state in which the pad 10 is parallel to the horizontal direction H by interposing a member such as a shim on the side of the load cell 13B.

Example of Tilting Operation of Tilting Mechanism 50

Figure 4:
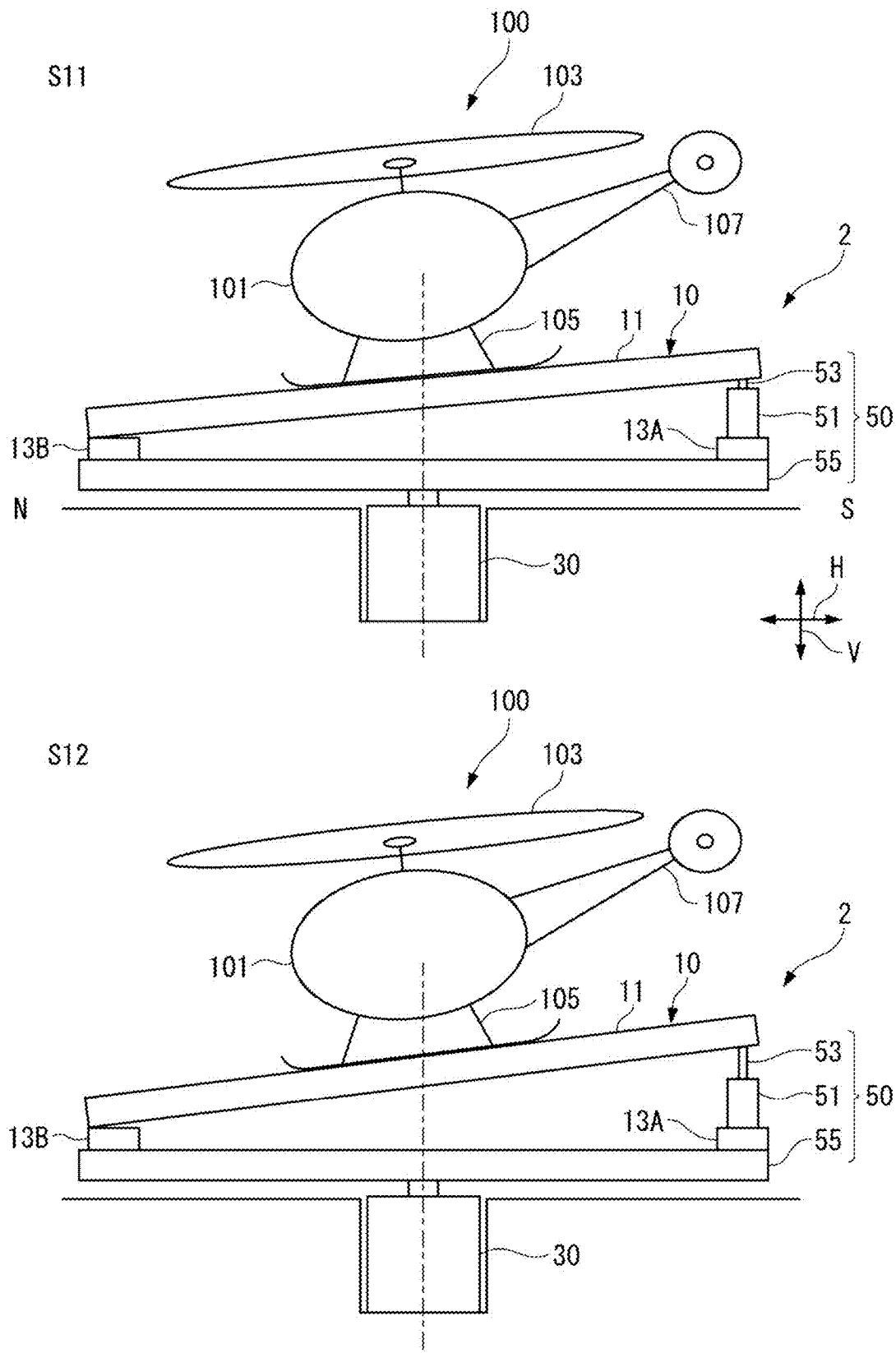
FIG. 4 is a side view illustrating the operation of a takeoff and landing pad apparatus according to a second embodiment.

FIG. 4 illustrates the operation of the tilting mechanism 50 when the wind blows from north N to south S.

Before the operation of the tilting mechanism 50 is started, most of the piston rod 53 is accommodated in the hydraulic cylinder 51 in the standby state (S11 in FIG. 4).

Before tilting the pad 10, the electric motor 30 is rotated such that the nose 101 of the drone 100 faces upwind. The rotation is controlled in the same manner as in the first embodiment.

When the nose 101 faces upwind, the piston rod 53 of the hydraulic cylinder 51 is extended to make the inclination of the pad 10 larger than that in the standby state. The degree of the inclination of the pad 10 can be adjusted by the degree of extension of the piston rod 53.

Control Procedure of Takeoff and Landing Pad Apparatus 2: See FIG. 5

Figure 5:
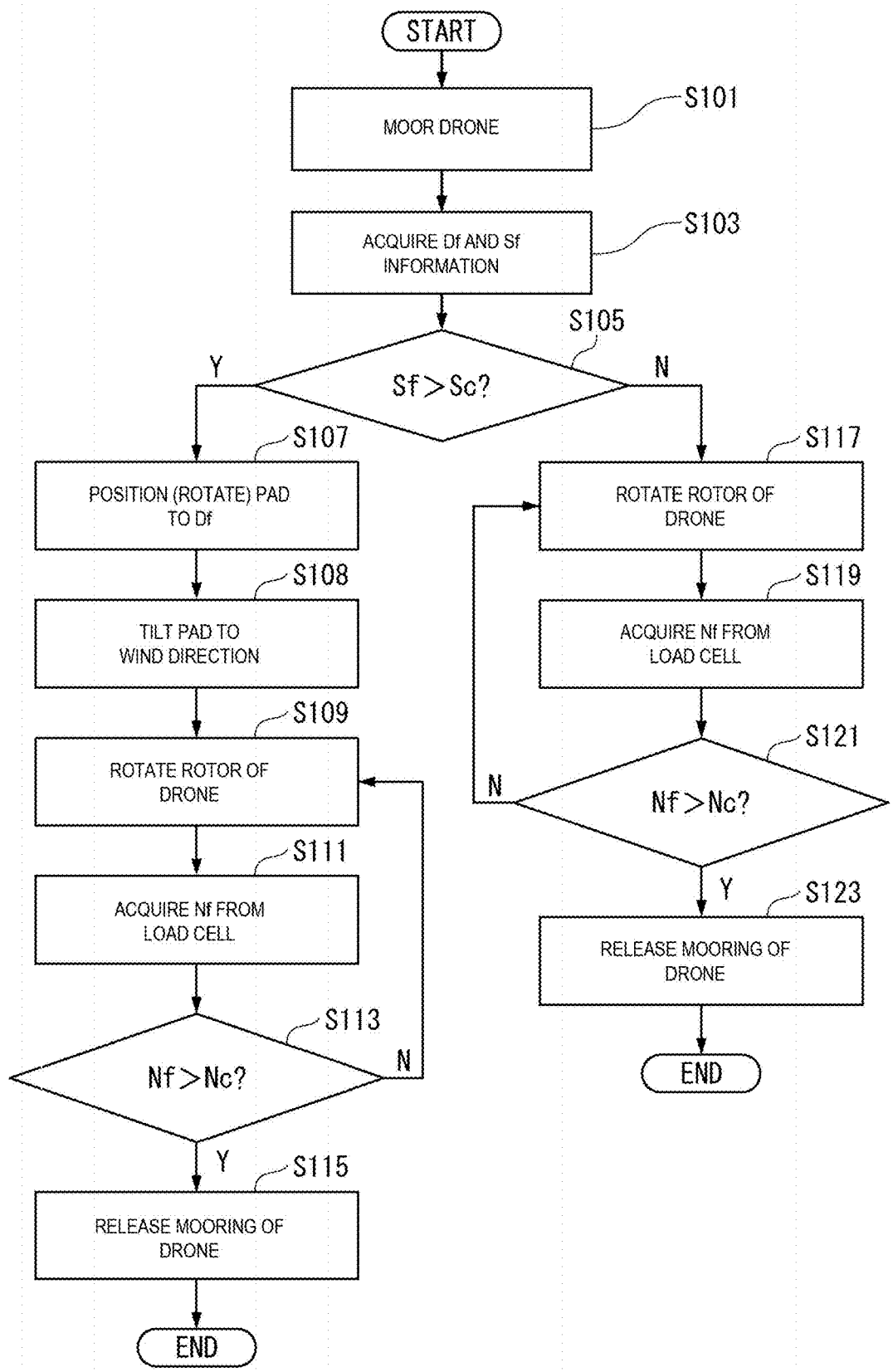
FIG. 5 is a flowchart illustrating a control procedure of the takeoff and landing pad apparatus according to the second embodiment.

The takeoff and landing pad apparatus 2 controls the pad 10 such that the pad 10 is rotated to direct the nose 101 upwind (S107 in FIG. 5), and then the piston rod 53 is extended at a position where the nose 101 is directed upwind to tilt the pad 10 (S108), as illustrated in FIG. 5. Directing the nose 101 upwind and tilting the pad 10 enable the drone 100 to take off more stably.

In the first embodiment and the second embodiment described above, the drone 100 as a helicopter in which the nose 101 can be visually recognized from the appearance is taken as an example. However, the disclosure is also applicable to a multicopter including a plurality of rotors. Also in a multicopter, a nose is set in advance, and flight such as forward and backward movement is executed with reference to the nose. However, in the case of the multicopter, it may be difficult to visually recognize the nose from the appearance. In that case, a mark such as a color or a symbol may be provided so that the nose is easily recognized. Accordingly, it is possible to visually and easily confirm that the nose of the multicopter faces upwind according to the disclosure.

Supplementary Notes

The takeoff and landing pad apparatus (1, 2) described above is grasped as follows.

Supplementary Note 1

The takeoff and landing pad apparatus (1, 2) includes: the pad (10) including the takeoff and landing surface (11); the mooring mechanism (20) that moors the unmanned aerial vehicle (100) on the pad; the drive source (30) that rotates the pad (10) together with the mooring mechanism; and the controller (60) that controls operation with the mooring mechanism and the drive source.

The controller (60) drives the drive source (30) to rotate such that the nose of the unmanned aerial vehicle on the takeoff and landing surface faces the wind direction based on information about a wind direction to be acquired.

Supplementary Note 2

Preferably, the controller (60) of Supplementary Note 1 acquires the information about the wind direction from an attached anemoscope or acquires the information about the wind direction from provided information about weather.

Supplementary Note 3

Preferably, the controller (60) of Supplementary Note 1 or Supplementary Note 2 drives the drive source (30) to rotate based on a position of the pad (10) in a rotational direction or drives the drive source (30) to rotate by detecting a position of the nose of the unmanned aerial vehicle on the takeoff and landing surface.

Supplementary Note 4

In any one of Supplementary Notes 1 to 3, preferably, the takeoff and landing pad apparatus (2) includes the tilting mechanism (50) that tilts the pad (10), and the controller (60) drives, based on information about a wind speed to be acquired, the tilting mechanism (50) in a state in which the nose faces the wind direction.

Supplementary Note 5

In any one of Supplementary Notes 1 to 4, preferably, the controller (60) releases mooring of the unmanned aerial vehicle (100) by the mooring mechanism (20) based on a measured thrust force acquired for the unmanned aerial vehicle (100) on the takeoff and landing surface before takeoff or a rotational speed of a rotor (103) included in the unmanned aerial vehicle (100).

Supplementary Note 6

In Supplementary Note 5, preferably, the mooring mechanism (20) magnetically moors the unmanned aerial vehicle (100).

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A takeoff and landing pad apparatus for an unmanned aerial vehicle, the takeoff and landing pad apparatus comprising:
   a pad including a takeoff and landing surface;
   a mooring mechanism configured to moor the unmanned aerial vehicle on the pad;
   a drive source configured to rotate the pad together with the mooring mechanism; and
   a controller configured to control operation with the mooring mechanism and the drive source, wherein
   the controller drives, based on information about a wind direction to be acquired, the drive source to rotate such that a nose of the unmanned aerial vehicle on the takeoff and landing surface faces the wind direction, and
   the controller releases mooring of the unmanned aerial vehicle by the mooring mechanism based on a measured thrust force acquired for the unmanned aerial vehicle on the takeoff and landing surface before takeoff or a rotational speed of a rotor included in the unmanned aerial vehicle.

2. The takeoff and landing pad apparatus according to claim 1, wherein the controller acquires the information about the wind direction from an attached anemoscope or acquires the information about the wind direction from provided information about weather.

3. The takeoff and landing pad apparatus according to claim 1, wherein the controller drives the drive source to rotate drive based on a position of the pad in a rotational direction or drives the drive source to rotate by detecting a position of the nose of the unmanned aerial vehicle on the takeoff and landing surface.

4. The takeoff and landing pad apparatus according to claim 1, comprising a tilting mechanism configured to tilt the pad, wherein
   the controller drives, based on information about a wind speed to be acquired, the tilting mechanism in a state in which the nose faces the wind direction.

5. The takeoff and landing pad apparatus according to claim 1, wherein the mooring mechanism magnetically moors the unmanned aerial vehicle.

* * * * *